(12) United States Patent
Raichelgauz et al.

(10) Patent No.: US 9,218,606 B2
(45) Date of Patent: Dec. 22, 2015

(54) SYSTEM AND METHOD FOR BRAND MONITORING AND TREND ANALYSIS BASED ON DEEP-CONTENT-CLASSIFICATION

(71) Applicant: Cortica, Ltd., Tirat Carmel (IL)

(72) Inventors: Igal Raichelgauz, Ramat Gan (IL); Karina Odinaev, Ramat Gan (IL); Yehoshua Y. Zeevi, Haifa, IL (US)

(73) Assignee: Cortica, Ltd., Tel Aviv (IL)

( * ) Notice: Subject to any disclaimer, the term of this patent is extended or adjusted under 35 U.S.C. 154(b) by 213 days.

(21) Appl. No.: 13/874,115

(22) Filed: Apr. 30, 2013

(65) Prior Publication Data

US 2013/0238393 A1 Sep. 12, 2013

Related U.S. Application Data

(63) Continuation-in-part of application No. 13/624,397, filed on Sep. 21, 2012, which is a continuation-in-part of application No. 13/344,400, filed on Jan. 5, 2012, now Pat. No. 8,959,037, which is a continuation of (Continued)

(30) Foreign Application Priority Data

| Oct. 26, 2005 | (IL) | 171577 |
| Jan. 29, 2006 | (IL) | 173409 |
| Aug. 21, 2007 | (IL) | 185414 |

(51) Int. Cl.
*G06N 5/02* (2006.01)
*G06F 17/30* (2006.01)

(Continued)

(52) U.S. Cl.
CPC ...... *G06Q 30/0201* (2013.01); *G06F 17/30864* (2013.01); *G06N 5/02* (2013.01); *H04N 7/17318* (2013.01); *H04N 21/25891* (2013.01);

(Continued)

(58) Field of Classification Search
None
See application file for complete search history.

(56) References Cited

U.S. PATENT DOCUMENTS

| 4,972,363 A | 11/1990 | Nguyen et al. |
| 5,978,754 A | 11/1999 | Kumano |

(Continued)

FOREIGN PATENT DOCUMENTS

| WO | 02/31764 | 4/2002 |
| WO | 2007/0049282 | 5/2007 |

OTHER PUBLICATIONS

Foote, Jonathan, et al. "Content-Based Retrieval of Music and Audio", 1997 Institute of Systems Science, National University of Singapore, Singapore (Abstract).
Ribert et al. "An Incremental Hierarchical Clustering", Visicon Interface 1999, pp. 586-591.
Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

(Continued)

*Primary Examiner* — Jeffrey A Gaffin
*Assistant Examiner* — Mikayla Chubb
(74) *Attorney, Agent, or Firm* — M&B IP Analysts, LLC

(57) ABSTRACT

A system and method for monitoring a brand sentiment through a plurality of different web sources are provided. The method comprises receiving a request to monitor a brand; searching the plurality of web sources for multimedia content elements related to the brand; generating at least one signature for each multimedia content element determined to be related to the brand, wherein each of the at least one generated signatures represents a concept; and correlating the concepts respective of the generated signatures to determine a context of the multimedia content elements determined to be related to the brand, wherein the context is the brand sentiment.

23 Claims, 5 Drawing Sheets

Related U.S. Application Data application No. 12/434,221, filed on May 1, 2009, now Pat. No. 8,112,376, said application No. 13/624,397 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 13/624,397 is a continuation-in-part of application No. 12/084,150, filed as application No. PCT/IL2006/001235 on Oct. 26, 2006, now Pat. No. 8,655,801.

(60) Provisional application No. 61/789,576, filed on Mar. 15, 2013.

(51) Int. Cl.
| | |
|---|---|
| *H04N 21/466* | (2011.01) |
| *H04N 21/81* | (2011.01) |
| *H04N 21/258* | (2011.01) |
| *G06Q 30/02* | (2012.01) |
| *H04N 7/173* | (2011.01) |
| *H04N 21/2668* | (2011.01) |

(52) U.S. Cl.
CPC ......... *H04N21/2668* (2013.01); *H04N 21/466* (2013.01); *H04N 21/8106* (2013.01)

(56) References Cited

U.S. PATENT DOCUMENTS

| | | | |
|---|---|---|---|
| 6,052,481 | A | 4/2000 | Grajski et al. |
| 6,076,088 | A | 6/2000 | Paik et al. |
| 6,122,628 | A | 9/2000 | Castelli et al. |
| 6,128,651 | A | 10/2000 | Cezar |
| 6,243,375 | B1 | 6/2001 | Speicher |
| 6,381,656 | B1 | 4/2002 | Shankman |
| 6,422,617 | B1 | 7/2002 | Fukumoto et al. |
| 6,611,628 | B1 | 8/2003 | Sekiguchi et al. |
| 6,618,711 | B1 | 9/2003 | Ananth |
| 6,643,620 | B1 | 11/2003 | Contolini et al. |
| 6,665,657 | B1 | 12/2003 | Dibachi |
| 6,751,613 | B1 | 6/2004 | Lee et al. |
| 6,754,435 | B2 | 6/2004 | Kim |
| 6,763,519 | B1 | 7/2004 | McColl et al. |
| 6,804,356 | B1 | 10/2004 | Krishnamachari |
| 6,819,797 | B1 | 11/2004 | Smith et al. |
| 6,901,207 | B1 | 5/2005 | Watkins |
| 7,006,689 | B2 | 2/2006 | Kasutani |
| 7,013,051 | B2 | 3/2006 | Sekiguchi et al. |
| 7,020,654 | B1 | 3/2006 | Najmi |
| 7,047,033 | B2 | 5/2006 | Wyler |
| 7,260,564 | B1 | 8/2007 | Lynn et al. |
| 7,302,117 | B2 | 11/2007 | Sekiguchi et al. |
| 7,313,805 | B1 | 12/2007 | Rosin et al. |
| 7,340,458 | B2 | 3/2008 | Vaithilingam et al. |
| 7,353,224 | B2 | 4/2008 | Chen et al. |
| 7,376,672 | B2 | 5/2008 | Weare |
| 7,376,722 | B1 | 5/2008 | Sim et al. |
| 7,433,895 | B2 | 10/2008 | Li et al. |
| 7,464,086 | B2 | 12/2008 | Black et al. |
| 7,526,607 | B1 | 4/2009 | Singh et al. |
| 7,536,417 | B2 | 5/2009 | Walsh et al. |
| 7,574,668 | B2 | 8/2009 | Nunez et al. |
| 7,660,737 | B1 | 2/2010 | Lim et al. |
| 7,694,318 | B2 | 4/2010 | Eldering et al. |
| 7,697,791 | B1 | 4/2010 | Chan et al. |
| 7,769,221 | B1 | 8/2010 | Shakes et al. |
| 7,788,132 | B2 | 8/2010 | Desikan et al. |
| 7,860,895 | B1 | 12/2010 | Scofield et al. |
| 7,904,503 | B2 | 3/2011 | Van De Sluis |
| 7,920,894 | B2 | 4/2011 | Wyler |
| 7,921,107 | B1 | 4/2011 | Chang et al. |
| 7,974,994 | B2 | 7/2011 | Li et al. |
| 7,987,194 | B1 | 7/2011 | Walker et al. |
| 7,991,715 | B2 | 8/2011 | Schiff et al. |
| 8,000,655 | B2 | 8/2011 | Wang et al. |
| 8,098,934 | B2 | 1/2012 | Vincent et al. |
| 8,266,185 | B2 | 9/2012 | Raichelgauz et al. |
| 8,312,031 | B2 | 11/2012 | Raichelgauz et al. |
| 8,316,005 | B2 | 11/2012 | Moore |
| 8,677,377 | B2 | 3/2014 | Cheyer et al. |
| 8,682,667 | B2 | 3/2014 | Haughay |
| 8,688,446 | B2 | 4/2014 | Yanagihara |
| 8,706,503 | B2 | 4/2014 | Cheyer et al. |
| 8,775,442 | B2 | 7/2014 | Moore et al. |
| 8,868,619 | B2 | 10/2014 | Raichelgauz et al. |
| 8,898,568 | B2 | 11/2014 | Bull et al. |
| 9,031,999 | B2 | 5/2015 | Raichelgauz et al. |
| 2001/0019633 | A1 | 9/2001 | Tenze et al. |
| 2002/0107827 | A1 | 8/2002 | Benitez-Jimenez et al. |
| 2002/0123928 | A1 | 9/2002 | Eldering et al. |
| 2003/0041047 | A1 | 2/2003 | Chang et al. |
| 2003/0078766 | A1 | 4/2003 | Appelt et al. |
| 2003/0191764 | A1 | 10/2003 | Richards |
| 2004/0111465 | A1 | 6/2004 | Chuang et al. |
| 2004/0128142 | A1 | 7/2004 | Whitham |
| 2004/0128511 | A1 | 7/2004 | Sun et al. |
| 2004/0153426 | A1 | 8/2004 | Nugent |
| 2005/0177372 | A1 | 8/2005 | Wang et al. |
| 2006/0031216 | A1 | 2/2006 | Semple et al. |
| 2006/0153296 | A1 | 7/2006 | Deng |
| 2006/0173688 | A1 | 8/2006 | Whitham |
| 2006/0204035 | A1 | 9/2006 | Guo et al. |
| 2006/0236343 | A1 | 10/2006 | Chang |
| 2006/0242139 | A1 | 10/2006 | Butterfield et al. |
| 2006/0242554 | A1 | 10/2006 | Gerace et al. |
| 2006/0248558 | A1 | 11/2006 | Barton et al. |
| 2006/0253423 | A1 | 11/2006 | McLane et al. |
| 2007/0074147 | A1 | 3/2007 | Wold |
| 2007/0130159 | A1 | 6/2007 | Gulli et al. |
| 2007/0195987 | A1 | 8/2007 | Rhoads |
| 2007/0220573 | A1 | 9/2007 | Chiussi et al. |
| 2007/0244902 | A1 | 10/2007 | Seide et al. |
| 2007/0253594 | A1 | 11/2007 | Lu et al. |
| 2007/0294295 | A1 | 12/2007 | Finkelstein et al. |
| 2008/0040277 | A1 | 2/2008 | DeWitt |
| 2008/0049629 | A1 | 2/2008 | Morrill |
| 2008/0072256 | A1 | 3/2008 | Boicey et al. |
| 2008/0163288 | A1 | 7/2008 | Ghosal et al. |
| 2008/0201299 | A1 | 8/2008 | Lehikoinen et al. |
| 2008/0201314 | A1 | 8/2008 | Smith et al. |
| 2008/0204706 | A1 | 8/2008 | Magne et al. |
| 2008/0313140 | A1 | 12/2008 | Pereira et al. |
| 2009/0089587 | A1 | 4/2009 | Brunk et al. |
| 2009/0119157 | A1* | 5/2009 | Dulepet .................. 705/10 |
| 2009/0125529 | A1 | 5/2009 | Vydiswaran et al. |
| 2009/0148045 | A1 | 6/2009 | Lee et al. |
| 2009/0172030 | A1 | 7/2009 | Schiff et al. |
| 2009/0175538 | A1 | 7/2009 | Bronstein et al. |
| 2009/0204511 | A1 | 8/2009 | Tsang |
| 2009/0216639 | A1 | 8/2009 | Kapczynski et al. |
| 2009/0245603 | A1 | 10/2009 | Koruga et al. |
| 2009/0253583 | A1 | 10/2009 | Yoganathan |
| 2009/0277322 | A1 | 11/2009 | Cai et al. |
| 2010/0023400 | A1 | 1/2010 | Dewitt |
| 2010/0082684 | A1 | 4/2010 | Churchill et al. |
| 2010/0088321 | A1 | 4/2010 | Solomon et al. |
| 2010/0104184 | A1 | 4/2010 | Bronstein et al. |
| 2010/0106857 | A1 | 4/2010 | Wyler |
| 2010/0191567 | A1 | 7/2010 | Lee et al. |
| 2010/0268524 | A1 | 10/2010 | Nath et al. |
| 2010/0318493 | A1 | 12/2010 | Wessling |
| 2010/0322522 | A1 | 12/2010 | Wang et al. |
| 2011/0035289 | A1 | 2/2011 | King et al. |
| 2011/0106782 | A1 | 5/2011 | Ke et al. |
| 2011/0145068 | A1 | 6/2011 | King et al. |
| 2011/0202848 | A1 | 8/2011 | Ismalon |
| 2011/0208822 | A1 | 8/2011 | Rathod |
| 2011/0251896 | A1 | 10/2011 | Impollonia et al. |
| 2011/0313856 | A1 | 12/2011 | Cohen et al. |
| 2012/0167133 | A1 | 6/2012 | Carroll et al. |
| 2012/0330869 | A1* | 12/2012 | Durham .................. 706/16 |

(56) References Cited

U.S. PATENT DOCUMENTS

| | | | |
|---|---|---|---|
| 2013/0325550 A1* | 12/2013 | Varghese et al. | 705/7.31 |
| 2013/0332951 A1 | 12/2013 | Gharaat et al. | |
| 2014/0019264 A1* | 1/2014 | Wachman et al. | 705/14.72 |

OTHER PUBLICATIONS

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Cernansky et al., "Feed-forward Echo State Networks"; Proceedings of International Joint Conference on Neural Networks, Montreal, Canada, Jul. 31-Aug. 4, 2005.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Freisleben et al., "Recognition of Fractal Images Using a Neural Network", Lecture Notes in Computer Science, 1993, vol. 6861, 1993, pp. 631-637.

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

Fathy et al., "A Parallel Design and Implementation for Backpropagation Neural Network Using NIMD Architecture", 8th Mediterranean Electrotechnical Corsfe rersce, 19'96. Melecon '96, Date of Conference: May 13-16, 1996, vol. 3, pp. 1472-1475.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.

IPO Examination Report under Section 18(3) for corresponding UK application No. GB1001219.3, dated May 30, 2012.

IPO Examination Report under Section 18(3) for corresponding UK application No. GB1001219.3, dated Sep. 12, 2011.

Lin, C.; Chang, S.: "Generating Robust Digital Signature for Image/Video Authentication", Multimedia and Security Workshop at ACM Mutlimedia '98; Bristol, U.K., Sep. 1998; pp. 49-54.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Maass, W. et al.: "Computational Models for Generic Cortical Microcircuits", Institute for Theoretical Computer Science, Technische Universitaet Graz, Graz, Austria, published Jun. 10, 2003.

International Search Report for the corresponding International Patent Application PCT/IL2006/001235; Date of Mailing: Nov. 2, 2008.

Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.

Jaeger, H.: "The "echo state" approach to analysing and training recurrent neural networks", GMD Report, No. 148, 2001, pp. 1-43, XP002466251. German National Research Center for Information Technology.

Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.

Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.

Natsclager, T. et al.: "The "liquid computer": A novel strategy for real-time computing on time series", Special Issue on Foundations of Information Processing of Telematik, vol. 8, No. 1, 2002, pp. 39-43, XP002466253.

Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

International Search Authority: "Written Opinion of the International Searching Authority" (PCT Rule 43bis.1) including International Search Report for International Patent Application No. PCT/US2008/073852; Date of Mailing: Jan. 28, 2009.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; Date of Issuance: Jul. 28, 2009.

Boari et al, "Adaptive Routing for Dynamic Applications in Massively Parallel Architectures", 1995 IEEE, Spring 1995.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Garcia, "Solving the Weighted Region Least Cost Path Problem Using Transputers", Naval Postgraduate School, Monterey, California, Dec. 1989.

Mandhaoui, et al, "Emotional Speech Characterization Based on Multi-Features Fusion for Face-to-Face Interaction", Universite Pierre et Marie Curie, Paris, France, 2009.

Marti, et al, "Real Time Speaker Localization and Detection System for Camera Steering in Multiparticipant Videoconferencing Environments", Universidad Politecnica de Valencia, Spain, 2011.

Nagy et al, "A Transputer, Based, Flexible, Real-Time Control System for Robotic Manipulators", UKACC International Conference on CONTROL '96, Sep. 2-5, 1996, Conference 1996, Conference Publication No. 427, IEE 1996.

Scheper, et al. "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.

Theodoropoulos et al, "Simulating Asynchronous Architectures on Transputer Networks", Proceedings of the Fourth Euromicro Workshop on Parallel and Distributed Processing, 1996. PDP '96.

Guo et al, "AdOn: An Intelligent Overlay Video Advertising System", SIGIR, Boston, Massachusetts, Jul. 19-23, 2009.

Mei, et al., "Contextual In-Image Advertising", Microsoft Research Asia, pp. 439-448, 2008.

Mei, et al., "VideoSense—Towards Effective Online Video Advertising", Microsoft Research Asia, pp. 1075-1084, 2007.

Semizarov et al. "Specificity of Short Interfering RNA Determined through Gene Expression Signatures", PNAS, 2003, pp. 6347-6352.

* cited by examiner

US 9,218,606 B2

SYSTEM AND METHOD FOR BRAND MONITORING AND TREND ANALYSIS BASED ON DEEP-CONTENT-CLASSIFICATION

CROSS-REFERENCE TO RELATED APPLICATIONS

This application claims the benefit of U.S. provisional application No. 61/789,576 filed Mar. 15, 2013 and is a continuation-in-part (CIP) application of U.S. patent application Ser. No. 13/624,397 filed on Sep. 21, 2012, now pending. The U.S. patent application Ser. No. 13/624,397 application is a CIP application of:
(a) U.S. patent application Ser. No. 13/344,400 filed on Jan. 5, 2012, now pending, which is a continuation of U.S. patent application Ser. No. 12/434,221, filed May 1, 2009, now U.S. Pat. No. 8,112,376;
(b) U.S. patent application Ser. No. 12/195,863, filed Aug. 21, 2008, now U.S. Pat. No. 8,326,775, which claims priority under 35 USC 119 from Israeli Application No. 185414, filed on Aug. 21, 2007, and which is also a continuation-in-part of the below-referenced U.S. patent application Ser. No. 12/084,150; and,
(c) U.S. patent application Ser. No. 12/084,150 filed on Apr. 25, 2008, now pending, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006.

All of the applications referenced above are herein incorporated by reference for all that they contain.

TECHNICAL FIELD

The present invention relates generally to the analysis of multimedia content displayed in web-pages, and more specifically to a system for identifying trends, and analysis of multimedia content associated brands displayed in web-pages.

BACKGROUND

The World Wide Web (WWW) contains a variety of multimedia content which is commonly used by advertisers in order to promote different brands. Such advertisers, commonly use a variety of web platforms while trying to track the performance of their brands. The web platforms include, for example, social networks, banners in popular websites, advertisements in video clips, and so on.

As many web platforms are used as means for advertising, it has become more difficult to track the performance and efficiency of each web platform with regard to an advertisement or a practical brand. Furthermore, as the brands' sentiment cannot be determined in real-time it is highly difficult to track the trendiness of a brand's sentiment, for example, the tracking of the users' likes or dislikes of a practical brand at any given time.

It would be therefore advantageous to provide a solution for trend analysis of brands advertised through the various the web platforms.

SUMMARY

Certain embodiments disclosed herein include a method for monitoring a brand sentiment through a plurality of different web sources. The method comprises receiving a request to monitor a brand; searching the plurality of web sources for multimedia content elements related to the brand; generating at least one signature for each multimedia content element determined to be related to the brand, wherein each of the at least one generated signatures represents a concept; and correlating the concepts respective of the generated signatures to determine a context of the multimedia content elements determined to be related to the brand, wherein the context is the brand sentiment.

Certain embodiments disclosed herein also include a system for monitoring a brand sentiment through a plurality of different web sources. The system comprises an interface to a network for receiving a request to monitor a brand and an input multimedia content element representing the brand; and a processing unit configured to: search the plurality of web sources for multimedia content elements related to the brand; and correlate concepts respective of signatures for determining multimedia content elements determined to be related to the brand, and a context of the multimedia content elements determined to be related to the brand, wherein the context is the brand sentiment.

BRIEF DESCRIPTION OF THE DRAWINGS

The disclosed subject matter is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
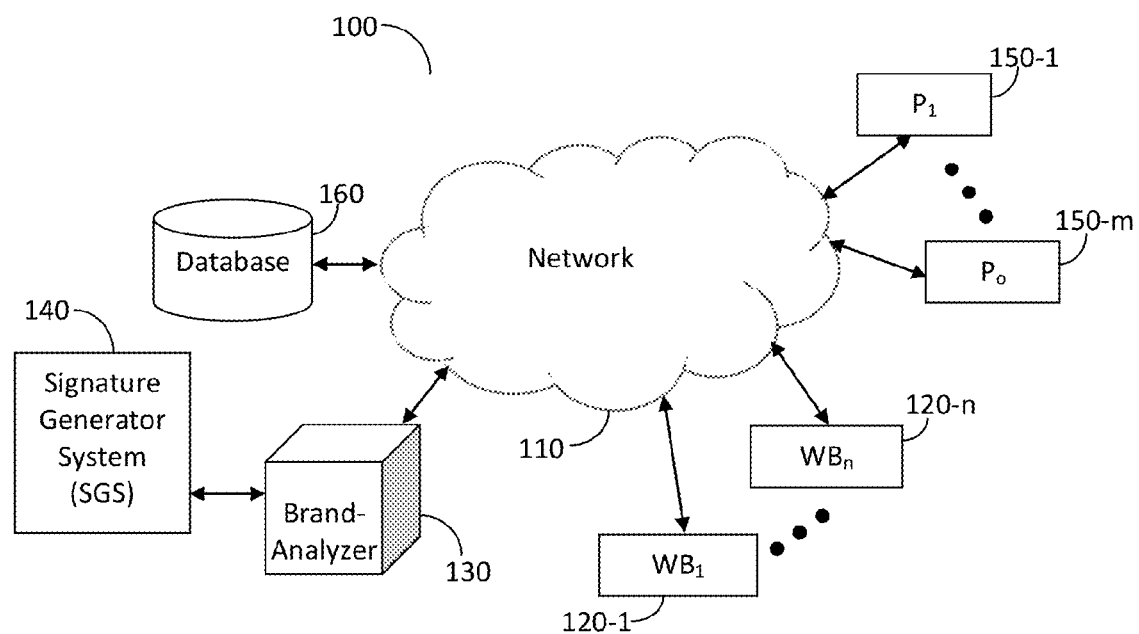
FIG. 1 is a schematic block diagram of a network system utilized to describe the various embodiments disclosed herein.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments disclosed herein allow analyzing one or more multimedia content elements to identify the existence of a brand advertised or otherwise displayed through a plurality of web platforms. For each identified multimedia content element at least one signature is generated. The signatures are utilized to determine a brand's sentiment. The determined sentiment may be a positive, a natural or negative sentiment. The determined brand's sentiment is stored in a database. The determination of the brand's sentiment may be based in part, on an identification of a volume appearance of the brand or one or more items related to the brand within the multimedia content, a context in which the brand is appeared, and so on. The trendiness of a brand's sentiment is determined respective of its previously determined sentiments as stored in the database.

FIG. 1 shows an exemplary and non-limiting schematic diagram of a network system 100 utilized to describe the various embodiments disclosed herein. A network 110 is used to communicate between different parts of the system 100. The network 110 may be the Internet, the world-wide-web (WWW), a local area network (LAN), a wide area network (WAN), a metro area network (MAN), and other networks capable of enabling communication between the elements of the system 100.

Further connected to the network 110 are one or more client applications, such as web browsers (WB) 120-1 through 120-$n$ (collectively referred to hereinafter as web browsers 120 or individually as a web browser 120). A web browser 120 is executed over a computing device including, for example, a personal computer (PC), a personal digital assistant (PDA), a mobile phone, a smart phone, a tablet computer, and other kinds of wired and mobile appliances, equipped with browsing, viewing, listening, filtering, and managing capabilities etc., that are enabled as further discussed herein below.

The system 100 also includes a plurality of servers 150-1 through 150-$m$ (collectively referred to hereinafter as servers 150 or individually as server 150) being connected to the network 110. Each of the servers 150 may be, for example, a web server, an application server, a publisher server, an ad-serving system, a data repository, a database, and the like. Also connected to the network 110 is a data warehouse 160 that stores multimedia content elements, clusters of multimedia content elements, and the context determined for a web page as identified by its URL. In the embodiment illustrated in FIG. 1, a brand-analyzer 130 communicates with the data warehouse 160 through the network 110. In other non-limiting configurations, the brand-analyzer 130 is directly connected to the data warehouse 160.

The various embodiments disclosed herein are realized using the brand-analyzer 130 and a signature generator system (SGS) 140. The SGS 140 may be connected to the brand-analyzer 130 directly or through the network 110. The brand-analyzer 130 is enabled to receive and serve multimedia content elements and causes the SGS 140 to generate a signature respective of the multimedia content elements. The process for generating the signatures for the multimedia content elements is explained in greater detail herein below with respect to FIGS. 3 and 4. It should be noted that each of the brand-analyzer 130 and the SGS 140, typically comprises a processing unit, such as a processor (not shown) that is coupled to a memory. The memory contains instructions that can be executed by the processing unit. The transaction of the brand-analyzer 130 also includes an interface (not shown) to the network 110. According to one embodiment, the brand-analyzer 130 is a server system.

According to the disclosed embodiments, the brand-analyzer 130 is configured to receive at least a URL of a web page hosted in the server 150 and accessed by a web browser 120. The brand-analyzer 130 is further configured to analyze the multimedia content elements contained in the web page to determine their context, thereby ascertaining the context of the web page. This is performed based on at least one signature generated for each multimedia content element. It should be noted that the context of an individual multimedia content element or a group of elements is extracted from the web page, received from a user of a web browser 120 (e.g., uploaded video clip), or retrieved from the data warehouse 160.

According to the embodiments disclosed herein, a user visits a web-page using a web browser 120. When the web-page is uploaded on the user's web browser 120, a request is sent to the brand-analyzer 130 to analyze the multimedia content elements contained in the web-page. The request to analyze the multimedia content elements can be generated and sent by a script executed in the web-page, an agent installed in the web-browser, or by one of the servers 150 (e.g., a web server or a publisher server) when requested to upload one or more advertisements to the web-page. The request to analyze the multimedia content may include a URL of the web-page or a copy of the web-page. In one embodiment, the request may include multimedia content elements extracted from the web-page. A multimedia content element may include, for example, an image, a graphic, a video stream, a video clip, an audio stream, an audio clip, a video frame, a photograph, an image of signals (e.g., spectrograms, phasograms, scalograms, etc.), and/or combinations thereof and portions thereof.

The brand-analyzer 130 analyzes the multimedia content elements in the web-page to determine if they are associated with a particular brand. As an example, if the web page contains an image of a bar, the image is analyzed to determine if it contains a logo of a brand-name lager. The logo may appear, for example, on beer glasses or on a signboard. Then at least one signature is generated by means of the SGS 140 for the identified brand. The generated signature(s) may be robust to noise and distortion as discussed below.

Then, using the generated signature(s) the brand-analyzer 130 searches for multimedia content elements containing the identified brand. The search may be performed by crawling the plurality of servers 150 and/or the data warehouse 160. In one embodiment, for each multimedia content element encountered during the search, at least one signature is generated which is compared to the signature of a multimedia element identifying the brand. If the signatures are substantially then the encountered multimedia content element is determined to be related to the brand. For example, a predefined number of least significant bits should be the same in the compared signatures.

The at least one signature generated for any multimedia content element that relates to the brand represents a concept. A concept is an abstract description of the content to which the signature was generated. As an example, a concept of the signature generated for a picture showing a bouquet of red roses is "flowers". As another example, a concept of the signature generated for a picture showing a bouquet of wilted roses is "wilted flowers". According to these examples a correlation between the concepts can be achieved by probabilistic models to determine that the concept of "Flowers" has a positive connotation in comparison to the concept "wilted flowers". Moreover, the correlation between concepts can be achieved by identifying a ratio between signatures' sizes, a spatial location of each signature, and so on using the probabilistic models.

As an example, according to an image analysis, a logo of a brand-name lager is identified on a beer glass in a bar and a tequila bottle sign is identified on a signboard at the entrance to the bar. Signatures are generated for the brand-name lager and the tequila sign. Because a generated signature represents a concept and is generated for a multimedia content element, the signature can also be utilized to determine if somehow the brand-name lager is liked or disliked. Such determination is possible, for example, respective of the identification of the ratio between the signatures' sizes (the brand-name lager compared with the tequila sign) and the spatial location of the brand-name lager compared with the tequila sign. According to this example, the brand of the tequila sign is probably more significant than the brand-name lager because the size of the sign and the signboard's location in the image are more significant than the lager's logo presented on the beer glass. It should be noted that identifying, for example, the ratio of signatures' sizes may also indicate the ratio between the sizes of their respective multimedia elements.

The brand-analyzer 130 then analyzes the signatures to correlate between their respective concepts and to determine a context of such a correlation. The context represents the brand sentiment. According to one embodiment, the determined sentiment may be a positive, natural, or negative sentiment. Because a context is the correlation between a plurality of concepts, a strong context is determined when there are more concepts than a predefined threshold which satisfy the same predefined condition.

An exemplary technique for determining the context from signatures generated for multimedia content elements is described in detail in U.S. patent application Ser. No. 13/770,603, filed Feb. 19, 2013, which is assigned to the common assignee, and is hereby incorporated by reference for all the useful information it contains.

Following is a non-limiting example for the operation of the brand-analyzer 130. An input image including a logo of the brand Gucci is received. A first signature is generated for the "Gucci" logo. Then, the brand-analyzer 130 crawls through one or more web sources in order to identify mentions of Gucci. Examples for such mentions include pictures of models wearing a Gucci Jacket, and/or fans commenting on such pictures through social media websites. The brand-analyzer 130 then generates at least one signature for any mention of the brand. For instance, the crawling process encountered a picture of model Kate Moss wearing Gucci sunglasses and a comment made by a fan of Kate Moss to a picture. A signature is generated for each such mention. That is, a first signature is generated for the Gucci logo (representing a first concept), a second signature is generated of Kate Moss's picture (representing a second concept), and a third signature is generated of the fan's comment (representing a third concept). The brand-analyzer 130 analyzes and correlates the first, second, and third signatures to determine the context of all the respective multimedia content elements. The context represents the sentiment of the brand.

In should be understood that the brand-analyzer 130 generates at least one signature for each identified comment, thus a plurality of comments may represent a plurality of concepts. Next, a correlation between the concepts is identified to determine, for example, if the sentiment of the brand is positive or negative, natural, popular, and so on. If the brand-analyzer 130 identifies a large number of comments mentioned respective of a certain brand, this may indicate that the brand is very popular. A sentiment of the brand's popularity can be positive, natural or negative depending, for example, on the content of the identified comments and the signatures generated thereof, the context in which the comments are made, and so on.

It should be further noted that using signatures for determining the context and thereby for the searching of advertisements ensures more accurate reorganization of multimedia content than, for example, when using metadata. For instance, in order to provide a matching advertisement for a sports car it may be desirable to locate a car of a particular model. However, in most cases the model of the car would not be part of the metadata associated with the multimedia content (image). Moreover, the car shown in an image may be at angles different from the angles of a specific photograph of the car that is available as a search item. The signature generated for that image would enable accurate recognition of the model of the car because the signatures generated for the multimedia content elements, according to the disclosed embodiments, allow for recognition and classification of multimedia content elements, such as, content-tracking, video filtering, multimedia taxonomy generation, video fingerprinting, speech-to-text, audio classification, element recognition, video/image search and any other application requiring content-based signatures generation and matching for large content volumes such as, web and other large-scale databases.

The signatures generated for more than one multimedia content element that relate to the brand are clustered. The clustered signatures are used to determine the context, and thereby the sentiment of the brand. The sentiment determined to the brand is saved in the data warehouse 160 (or any other database that may be connected to the brand-analyzer 130). The trendiness of a brand's sentiment is determined respective of previously determined sentiments as stored in the database. For example, the sentiment of the brand may trend from a positive to a negative sentiment over time, or vice versa.

Figure 2:
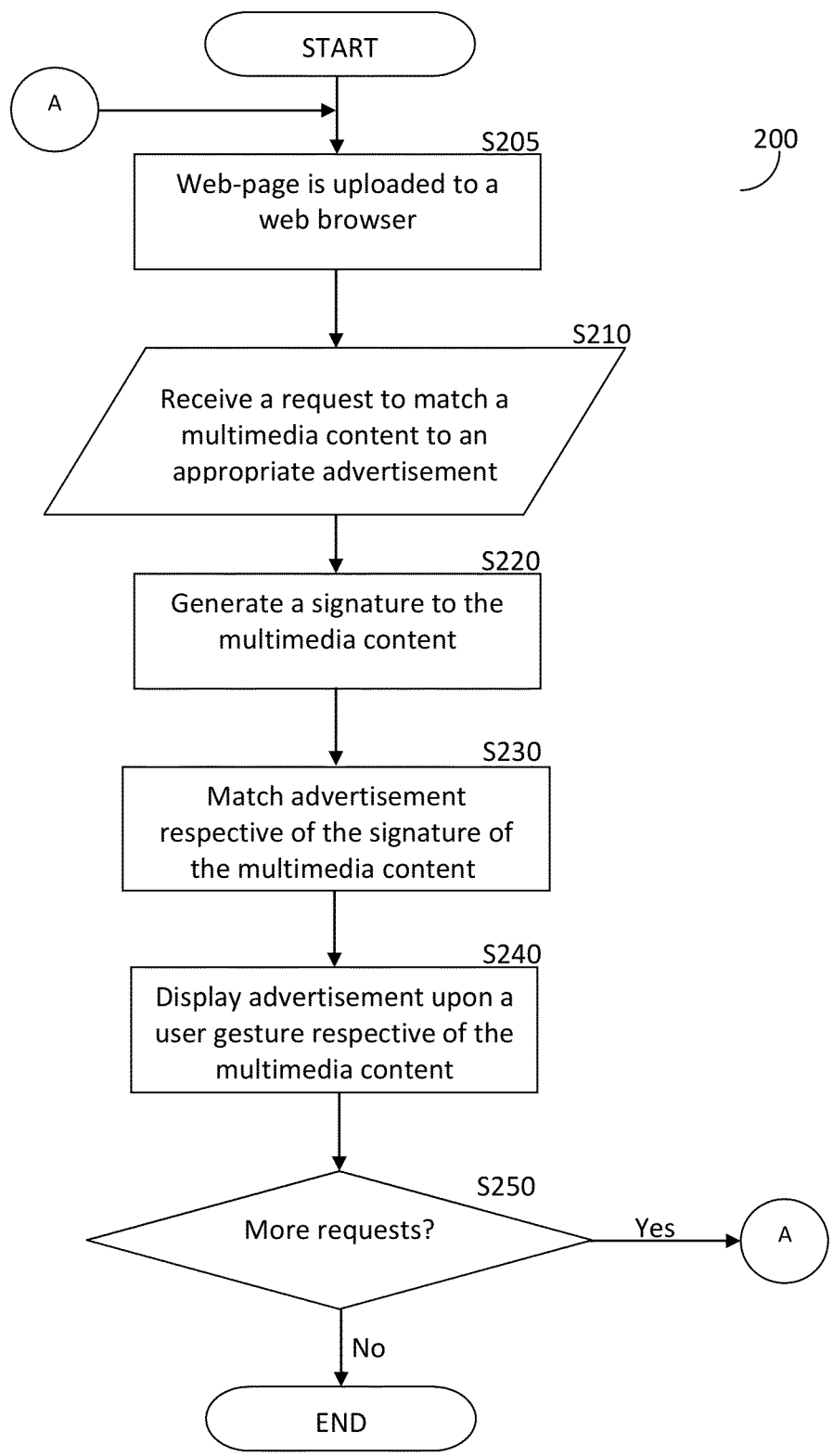
FIG. 2 is a flowchart describing the process of matching an advertisement to multimedia content displayed on a webpage.

FIG. 2 depicts an exemplary and non-limiting flowchart 200 describing the process of matching an advertisement to multimedia content displayed on a web-page. At S205, the method starts when a web-page is uploaded to one of the web-browsers (e.g., web browser 120-1). In S210, a request to match at least one multimedia content element contained in the uploaded web-page of an appropriate advertisement item is received. The request can be received from a publisher server, a script running on the uploaded web-page, or an agent (e.g., an add-on) installed in the web browser. S210 can also include extracting the multimedia content elements for a signature that should be generated.

In S220, at least one signature for the multimedia content element executed from the web page is generated. The signature for the multimedia content element generated by a signature generator is described below with respect to FIGS. 3 and 4. In one embodiment, based on the generated signatures, the context of the multimedia content elements related to a trend, and thereby the brand sentiment, are determined as described below with reference to FIG. 5.

In S230, an advertisement item is matched to the multimedia content element respective of its generated signatures and/or the determined context. According to one embodiment, the matching process includes searching for at least one advertisement item respective of the signature of the multimedia content and a display of the at least one advertisement item within the display area of the web-page. According to another embodiment, the signatures generated for the multimedia content elements are clustered and the cluster of signatures is matched to one or more advertisement items. According to yet another embodiment, the matching of an advertisement to a multimedia content element can be performed by the computational cores that are part of a large scale matching discussed in detail below.

In S240, upon a user's gesture the advertisement item is uploaded to the web-page and displayed therein. The user's gesture may be: a scroll on the multimedia content element, a press on the multimedia content element, and/or a response to the multimedia content. This ensures that the user's attention is given to the advertised content. In S250, it is checked whether there are additional requests to analyze multimedia content elements, and if so, execution continues with S210; otherwise, execution terminates.

As a non-limiting example for the operation of the process shown in FIG. 2, a user uploads a web-page that contains an image of a sea shore. The image is then analyzed and a signature is generated respective thereto. Respective of the image signature, an advertisement item (e.g., a banner) is matched to the image, for example, a swimsuit advertisement. Upon detection of a user's gesture, for example, a mouse scrolling over the sea shore image, the swimsuit ad is displayed.

Figure 3:
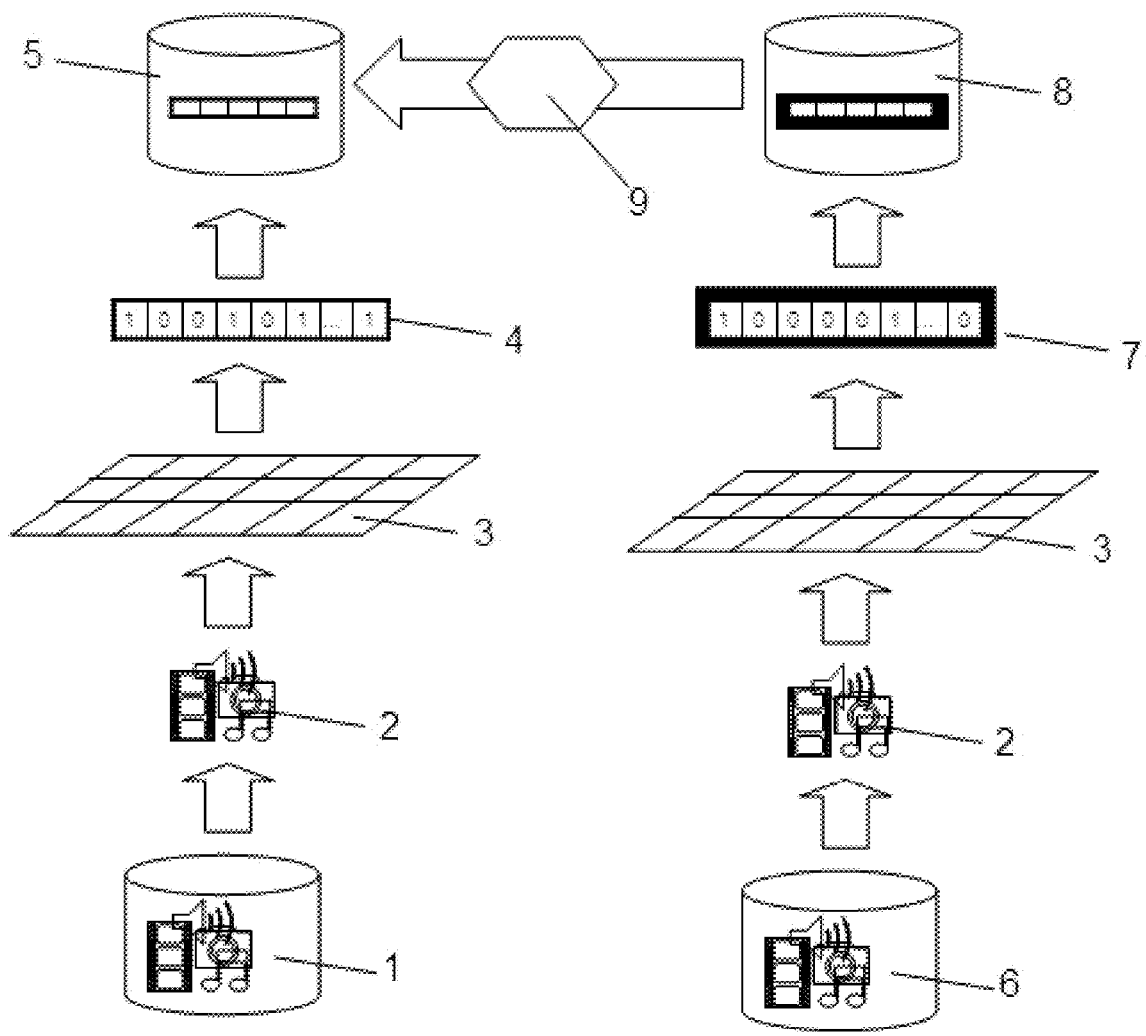
FIG. 3 is a block diagram depicting the basic flow of information in the signature generator system.
Figure 4:
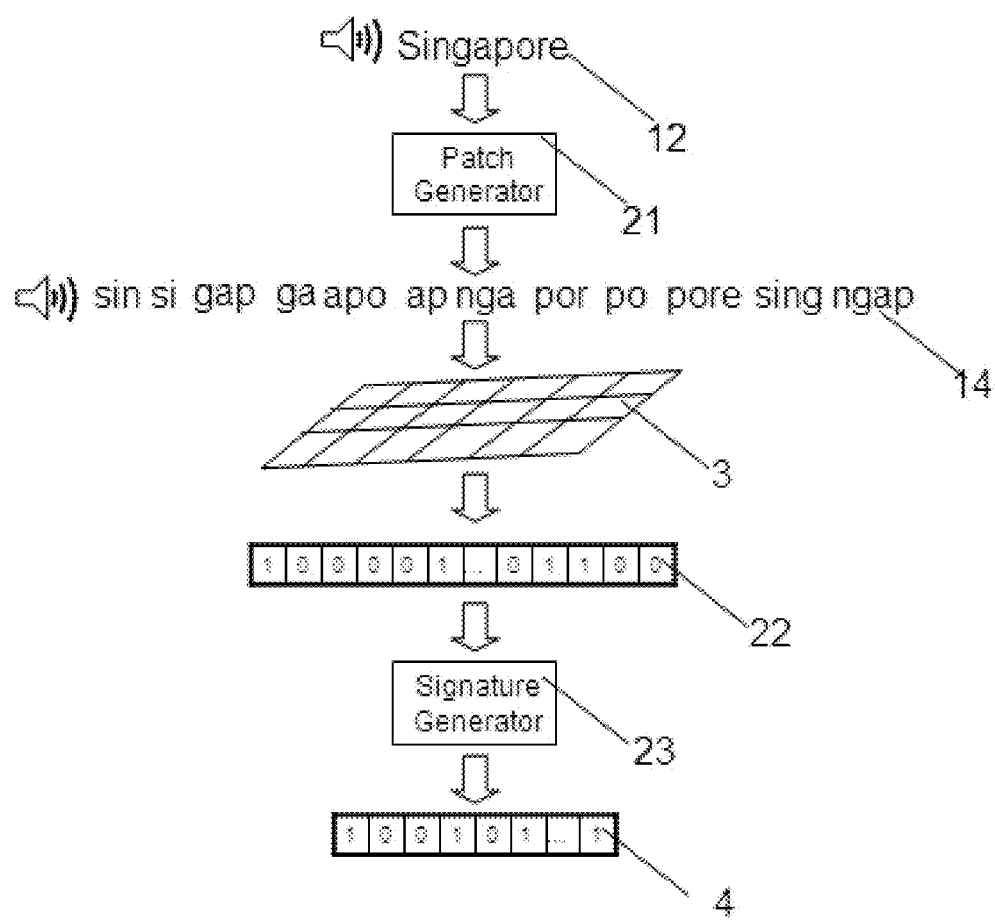
FIG. 4 is a diagram illustrating the flow of patches generation, response vector generation, and signature generation in a large-scale speech-to-text system.

FIGS. 3 and 4 illustrate the generation of signatures for the multimedia content elements by the SGS 140 according to one embodiment. An exemplary high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process is now described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the brand-analyzer 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core Ci={ni} (1≤i≤L) may consist of a single leaky integrate-to-threshold unit (LTU) node or more nodes. The node $n_i$ equations are:

$$V_i = \sum_j w_{ij} k_j$$

$$n_i = \Box(V_i - Th_x)$$

where, $\Box$ is a Heaviside step function; $w_{ij}$ is a coupling node unit (CNU) between node i and image component j (for example, grayscale value of a certain pixel j); kj is an image component 'j' (for example, grayscale value of a certain pixel j); $Th_x$ is a constant Threshold value, where 'x' is 'S' for Signature and 'RS' for Robust Signature; and Vi is a Coupling Node Value.

The Threshold values $Th_X$ are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:

1: For: $V_i > Th_{RS}$ $$1-p(V>Th_S)-1(1-\epsilon)^l \ll 1$$

i.e., given that lnodes (cores) constitute a Robust Signature of a certain image I, the probability that not all of these I nodes will belong to the Signature of same, but noisy image, $\tilde{\ }$ is sufficiently low (according to a system's specified accuracy).

2: $p(V_i > Th_{RS}) \approx 1/L$ i.e., approximately 1 out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

A detailed description of the Computational Core generation and the process for configuring such cores is discussed in more detail in the co-pending U.S. patent application Ser. No. 12/084,150 referenced above.

Figure 5:
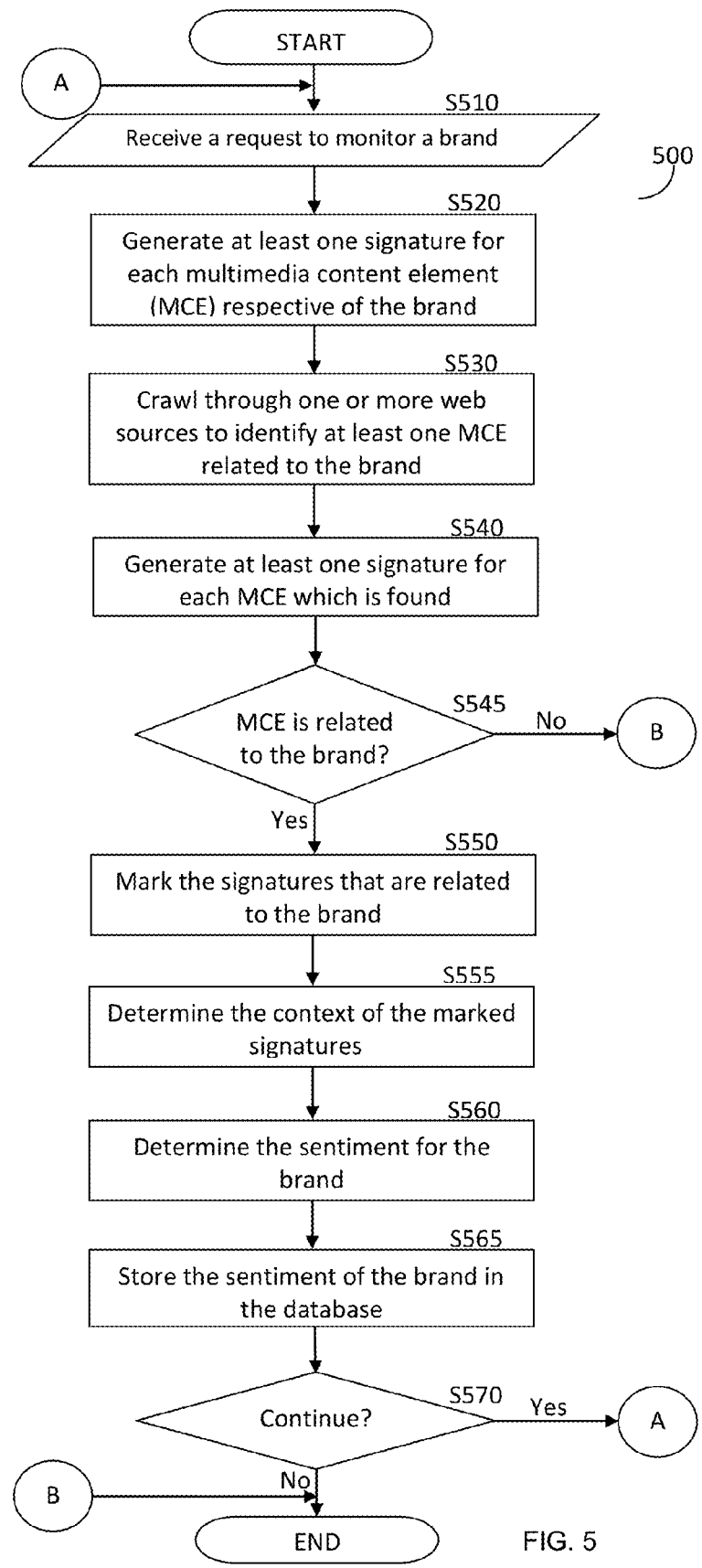
FIG. 5 is a flowchart describing a method for determining a sentiment with respect to a brand according to one embodiment.

FIG. 5 is a non-limiting and exemplary flowchart 500 describing a method for determining a sentiment of a particular brand according to one embodiment. In S510, a request to monitor a brand is received. The request may include at least one multimedia content element respective of the brand. A multimedia content element may be, for example, an image, a graphic, a video stream, a video clip, an audio stream, an audio clip, a video frame, a photograph, an image of signals, combinations thereof, and portions thereof.

Is S520, at least one signature is generated for each multimedia content element that is received. The at least one signature is robust to noise and distortions and is generated by the SGS 140 as described in greater detail above. The brand in the received multimedia content element is identified by the generated signature(s)

In S530, a search is performed for one or more multimedia content elements in which the brand may be identified. According to one embodiment, the search may be performed by crawling one or more web sources and/or web platforms to identify the existence of multimedia content elements that relate to the brand, for example, elements that mention, show, and/or describe, the brand. As a non-limiting example, the crawling may be performed through social media networks, web sites, blogs, news feeds, multimedia channels, or any platform in which the brand may be advertised and mentioned.

In S540, at least one signature is generated for each multimedia content element encountered during the search. Such signatures are also created by the SGS 140. In S545, it is checked if at least one of the multimedia content elements encountered during the search is related by reference to the brand which requested to be monitored. According to one embodiment, S545 includes comparing the at least one signature generated in S520 to the least one signature generated in S540; if the signatures are substantially similar, then it is determined that the brand is mentioned in the specific encountered multimedia element.

In S550, the signatures of those multimedia elements that are related to the brand are marked. In S555, the context of the marked signatures is determined by correlating their respective concepts as discussed above.

In S560, the sentiment of the brand is determined using the context. According to one embodiment, S560 includes identification of a strong context with respect to a certain sentiment value (e.g., positive, natural, or negative) by checking if a predefined number of concepts satisfy the same predefined condition. The predefined condition is set respective of a certain sentiment value. For example, if 70% of the concepts can be considered as trending towards a positive sentiment, then a strong context is established. A strong context can be also established based on the volume of the appearances of the brand in the crawled sources, that is, if the total number of related concepts exceeds a predefined threshold.

According to one embodiment the sentiment of the brand can be determined by correlating the concept generated for the brand with other concepts to determine if the brand has a positive, natural or negative connotation with respect to the other concept. The correlation can be performed using probabilistic models. According to another embodiment the trendiness of a brand's sentiment is also determined based on previously determined sentiments as stored in the database.

In S565, the determined sentiment for the brand is saved in a database (e.g., data warehouse 160). According one embodiment, the determined sentiment is saved in an entry that also maintains the brand name, the marked signatures (S550), and a time stamp. In S570, it is checked whether there are additional requests and if so execution continues with S510; otherwise, execution terminates.

In one embodiment, the trendiness is determined by evaluating changes in the sentiment values of a specific brand over time by analyzing the sentiment values and their time stamps as recorded in the database.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for monitoring a brand sentiment through a plurality of different web sources, comprising:
   receiving a request to monitor a brand;
   searching the plurality of web sources for multimedia content elements related to the brand;
   generating at least one signature for each multimedia content element determined to be related to the brand, wherein each of the at least one generated signatures represents a concept, wherein the concept is an abstract description of the content to which the signature was generated; and
   correlating the concepts respective of the generated signatures to determine a context of the multimedia content elements determined to be related to the brand, wherein the context is the brand sentiment.

2. The method of claim 1, further comprising:
   storing the brand sentiment, a time stamp, and the signatures generated for multimedia content elements related to the brand in a database.

3. The method of claim 1, wherein the request to monitor the brand includes an input multimedia content element representing the brand.

4. The method of claim 3, further comprising:
generating at least one signature for the input multimedia content element, wherein the at least one signature is robust to noise and distortions.

5. The method of claim 4, further comprising:
determining if a multimedia content element found through the search is related to the brand by matching at least one signature generated for the multimedia content element to the at least one signature generated for the input multimedia content element, wherein the multimedia content element is determined to be related to the brand if its respective at least one signature is substantially similar to the at least one signature generated for the input multimedia content element.

6. The method of claim 1, wherein determining the context of the multimedia content elements further comprises:
establishing a strong context, wherein the brand sentiment is set based on the strong context.

7. The method of claim 6, wherein the strong context is established based on at least one of: a volume of appearances of the brand throughout the web sources, a number of concepts satisfying a predefined condition being set respective of a certain sentiment.

8. The method of claim 7, wherein the certain sentiment is any one of: a positive sentiment, a natural sentiment, a negative sentiment.

9. The method of claim 1, wherein each of the plurality of different web sources is any one of: a social network, a blog, a web site, a news feed.

10. The method of claim 1, further comprising:
tracking a trendiness of the brand sentiment by monitoring changes in the brand segments over time.

11. The method of claim 1, wherein each of the plurality of multimedia content elements is at least one of: an image, graphics, a video stream, a video clip, an audio stream, an audio clip, a video frame, a photograph, images of signals, and portions thereof.

12. A non-transitory computer readable medium having stored thereon instructions for causing one or more processing units to execute the method according to claim 1.

13. A system for monitoring a brand sentiment through a plurality of different web sources, comprising:
an interface to a network for receiving a request to monitor a brand and an input multimedia content element representing the brand; and
a processing unit configured to:
search the plurality of web sources for multimedia content elements related to the brand; and
correlate concepts respective of signatures for determining multimedia content elements determined to be related to the brand, and a context of the multimedia content elements determined to be related to the brand, wherein the context is the brand sentiment, wherein the concept is an abstract description of the content to which the signature was generated.

14. The system of claim 13, further comprises:
a database for storing the brand sentiment, a time stamp, and the signatures generated for multimedia content elements related to the brand.

15. The system of claim 13, further comprises:
a signature generator system for generating the at least one signature for the input multimedia content element and at least one signature for each of the multimedia content elements determined to be related by reference to the brand, wherein each of the at least one generated signatures represents a concept.

16. The system of claim 15, wherein each of the at least one generated signatures is robust to noise and distortions.

17. The system of claim 15, wherein the signature generator system comprises a plurality of computational cores enabled to receive the multimedia content elements, each computational core of the plurality of computational cores having properties that are at least partly statistically independent of other of the computational cores, the properties are set independently of each other core.

18. The system of claim 15, wherein the processing unit is further configured to determine if a multimedia content element found through the search is related to the brand by matching at least one signature generated for the multimedia content element to the at least one signature generated for the input multimedia content element, wherein the multimedia content element is determined to be related to the brand if its respective at least one signature is substantially similar to the at least one signature generated for the input multimedia content element.

19. The system of claim 18, wherein the processing unit is further configured to:
determine the context of the multimedia content elements by establishing a strong context, wherein the brand sentiment is set based on the strong context.

20. The system of claim 19, wherein the strong context is established based on at least one of: a volume of appearances of the brand throughout the web sources, a number of concepts satisfying a predefined condition being set respective of a certain sentiment.

21. The system of claim 20, wherein the certain sentiment is any one of: a positive sentiment, a natural sentiment, a negative sentiment.

22. The system of claim 13, wherein each of the plurality of different web sources is any one of: a social network, a blog, a web site, a news feed.

23. The system of claim 13, wherein the system is further configured to:
track a trendiness of the brand sentiment by monitoring changes in the brand segments over time.

* * * * *